No. 747,980. PATENTED DEC. 29, 1903.
D. A. KENNEDY.
CLEANING MACHINE.
APPLICATION FILED JULY 24, 1903.
NO MODEL. 2 SHEETS—SHEET 1.
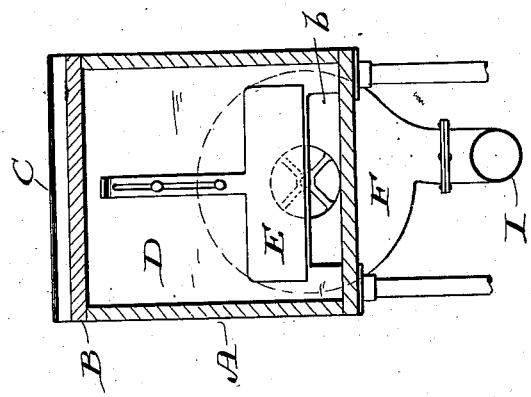
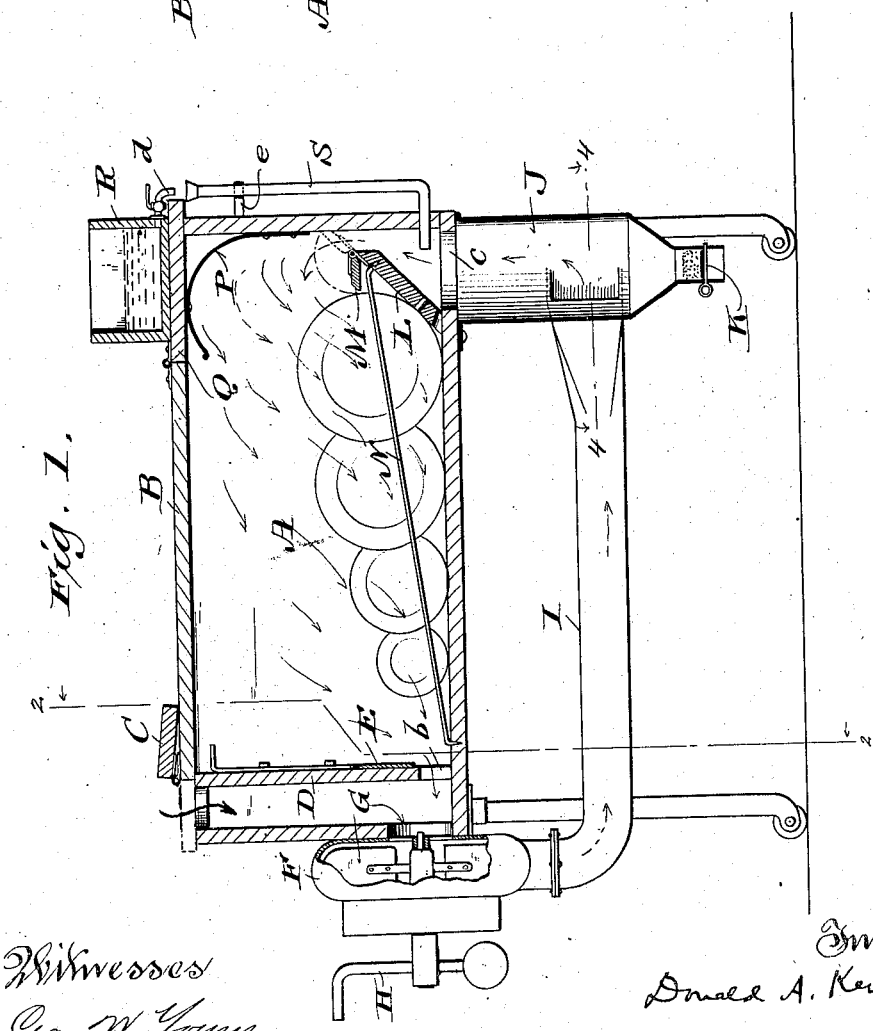

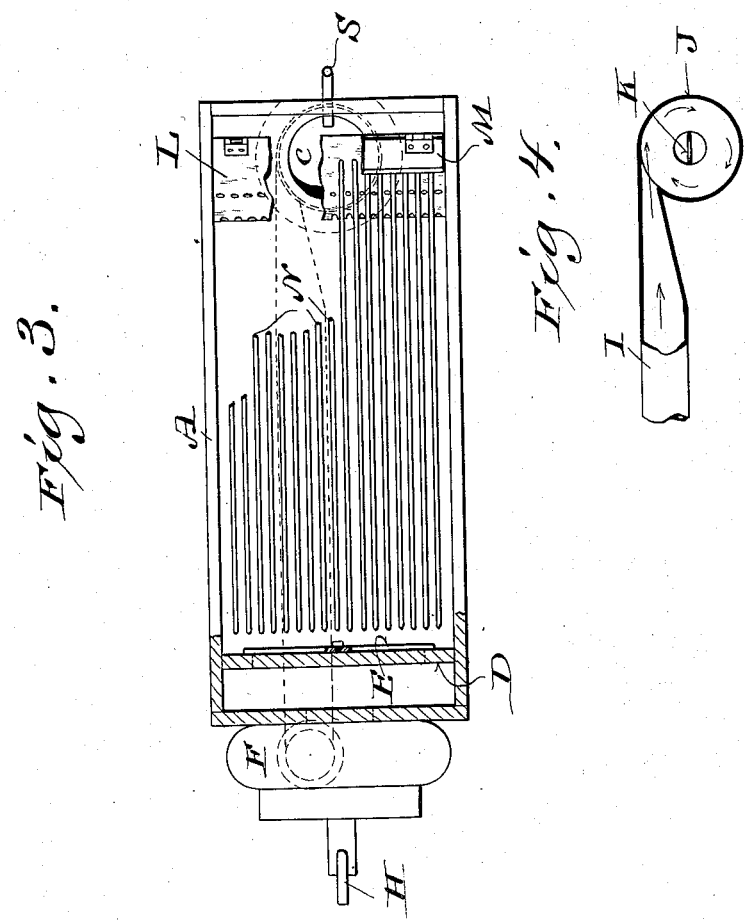

No. 747,980.

Patented December 29, 1903.

UNITED STATES PATENT OFFICE.

DONALD A. KENNEDY, OF ASHLAND, WISCONSIN.

CLEANING-MACHINE.

SPECIFICATION forming part of Letters Patent No. 747,980, dated December 29, 1903.

Application filed July 24, 1903. Serial No. 166,820. (No model.)

*To all whom it may concern:*

Be it known that I, DONALD A. KENNEDY, a citizen of the United States, and a resident of Ashland, in the county of Ashland and State of Wisconsin, have invented certain new and useful Improvements in Cleaning-Machines; and I do hereby declare that the following is a full, clear, and exact description thereof.

My invention has for its object to provide simple economical means for rapid thorough cleaning and drying of various articles, especially dishes, the same consisting in what is hereinafter particularly set forth with reference to the accompanying drawings and subsequently claimed.

Figure 1 of the drawings represents a vertical longitudinal section of a cleaning and drying machine in accordance with my invention, parts of the machine being broken; Fig. 2, a transverse section indicated by line 2 2 in the first figure; Fig. 3, a plan view of the machine uncovered and in partly-horizontal section, a deflector constituting part of said machine being removed; and Fig. 4, a detail of the aforesaid machine, partly in section, on the plane indicated by line 4 4 in said first figure.

Referring by letter to the drawings, A indicates a rectangular receptacle supported by legs or otherwise and having a preferably hinged lid B, that of itself has a hinged section C, constituting a cover for the space between an end of the receptacle and a vertical partition D therein, said space being hereinafter termed an "air-duct." The lower portion of the partition is recessed to provide a port *b* of suitable area, and guided on said partition is a slide E, by which to open and close the port. In line with said port the adjacent end of the receptacle A is provided with an opening into a casing F, containing a rotary fan G, herein shown as having a balanced crank H in connection with the outer end of its shaft. Leading from the fan-casing is an elbowed flue I, that extends under the receptacle A and has tangent connection with a chamber J, depending from said receptacle in communication with a bottom opening *c* at that end of the same farthest from the partition D, the lower end of the chamber being reduced to form a spout in which a valve K is arranged. Inclined in the receptacle over the bottom opening *c* is a shield L, the lower portion of which is perforated, and a flap M, hinged to the upper end of the shield, closes against the adjacent end of the receptacle. Set in the inclined shield and the bottom of the receptacle are bent and pointed ends of a series of preferably inclined parallel rods N at suitable intervals apart, and a deflector P is arranged in said receptacle over said shield.

Supported on a stationary top portion Q of the receptacle A is a water-tank R, provided with a faucet *d*, and arranged under the faucet is the upper funnel end of a pipe S, for which a brace *e* is provided in connection with said receptacle. The lower horizontally-bent end of the pipe S extends into the receptacle A under the shield L and is immediately over the bottom opening *c* of said receptacle.

In practice plates are placed on edge in the receptacle A, between the rods N, as shown in Fig. 1, other dishes being stacked promiscuously on said rods and plates with their openings toward the fan. The lid-section C and flap M being laid back and the slide E lowered, the fan G is revolved at suitable speed to cause a blast of air to enter the receptacle containing the dishes. At the same time the faucet *d* of tank R is opened to let drops of water find their way through the pipe S into the air-blast. The moistened air being held for a time under compression in the receptacle A it reaches all the surface area of the dishes and softens all hard particles thereon. The slide E is now raised and the operation of the fan continued, the result being a circulation of moist air at high pressure through the dish-receptacle. Material loosened from the contents of the dish-receptacle is carried with the air, and said contents are scoured clean. The material, with the air, finds its way into the chamber J, and as the blast enters said chamber at a tangent there is a separation of said material from said air as a result of centrifugal force. The material, heavier than the air, descends in the chamber J, that for the time being has the valve K thereof set in closed position, and said material is subsequently discharged from said chamber by opening said valve. The washing operation having been completed, the water is cut off and the flap M swung to closed position, continued revolution of the fan G resulting in a partial vacuum in the receptacle A because of the perforations in the shield L, whereby there is an extraction of dirty contents that may have been left in said receptacle. The lid of the receptacle A is now swung up and the operation of the fan continued, the result being a blast of dry fresh air through said receptacle whereby the dishes therein are left dry, clean, and aired to a polish, ready for removal.

For the cleaning of such dishes that cannot readily be operated upon as above described the lid of the receptacle, with its section C is swung up against the tank R and said dishes held under the deflector P, exposed to a blast of moist air until cleaned and thereafter held over the space between the partition D and adjacent end of said receptacle for drying.

While I have shown and described a cleaning-machine in accordance with my invention especially organized for cleaning dishes, it may be utilized for cleaning various other articles with or without the aid of water.

Having thus described my invention, what I claim as new, and desire to secure by Letters Patent, is—

1. A receptacle provided with a lid a minor portion of which is made to be opened and closed independent of the remainder, a vertical partition in the receptacle adjacent to an end of same and therewith forming a space for which the minor portion of the lid constitutes a cover, means in connection with the partition for opening and closing a lower port by which communication is had between the major portion of the receptacle and said space, a rotary fan having its casing in communication with the aforesaid space in line with said port, a chamber depending from the receptacle in communication with a bottom opening of same at that end thereof farthest from said partition, a closure for the bottom outlet of the chamber, a flue from the fan-casing in tangent connection with the chamber, means for supplying water to air rising from said chamber, a perforated shield in the receptacle over the bottom of opening same, a flap in connection with the shield to close against the adjacent end of said receptacle, a deflector over said shield, and a series of parallel rods supported in said receptacle forward of the aforesaid shield.

2. A receptacle having a bottom opening at one end thereof, a depending chamber communicating with said opening and provided with a normally closed lower outlet, a vertical partition in the receptacle adjacent to its other end, a lid for the receptacle having a portion thereof constituting an independent closure for the space forward of the partition, means in connection with said partition for opening and closing a lower port between said space and the major portion of the receptacle, a blower communicating with the aforesaid space in line with said port and tangentially connected to said chamber, means for supplying water to air entering the receptacle through its bottom opening, and means for partly checking the inrush of air at will.

3. A receptacle having a bottom opening at one end thereof, a depending chamber communicating with said opening and provided with a normally closed lower outlet, a vertical partition in the receptacle adjacent to its other end, a lid for the receptacle having a portion thereof constituting an independent closure for space forward of the partition, means in connection with said partition for opening and closing a lower port between said space and major portion of the receptacle, a blower communicating with the aforesaid space in line with said port and also connected to said chamber, and means whereby the inrush of air to said receptacle can be partly checked at will.

4. A normally closed receptacle having a vertical air-duct at one end thereof, means for opening and closing a lower rear port of the air-duct, other means for likewise controlling the upper extremity of said duct, a blower in communication with the air-duct opposite said port of same, a separator-chamber communicating with a bottom outlet of the receptacle at that end of same farthest from the blower, a blower-flue having tangent connection with the chamber, and means whereby the inrush of air to said receptacle can be partly checked at will.

5. A normally closed receptacle having a vertical air-duct at one end thereof, means for opening and closing a lower rear port of the air-duct, other means for likewise controlling the upper extremity of said duct, a blower in communication with the air-duct opposite said port of same, a separator-chamber communicating with the bottom outlet of the receptacle at that end of same farthest from the blower, a blower-flue having tangent connection with the chamber, means for supplying water to air entering the receptacle through its bottom opening, and other means for partially checking the inrush of air at will.

6. A normally closed receptacle having a vertical air-duct at one end thereof, means for opening and closing a lower rear port of the air-duct, other means for likewise controlling the upper extremity of said duct, a blower in communication with the air-duct opposite said port of same, a separator-chamber communicating with a bottom outlet of the receptacle at that end of same farthest from the blower, and a blower-flue having tangent connection with the chamber.

In testimony that I claim the foregoing I have hereunto set my hand, at Ashland, in the county of Ashland and State of Wisconsin, in the presence of two witnesses.

DONALD A. KENNEDY.

Witnesses:
JOHN POSPISIEL,
BART GAFFNEY.